Patented July 5, 1927.

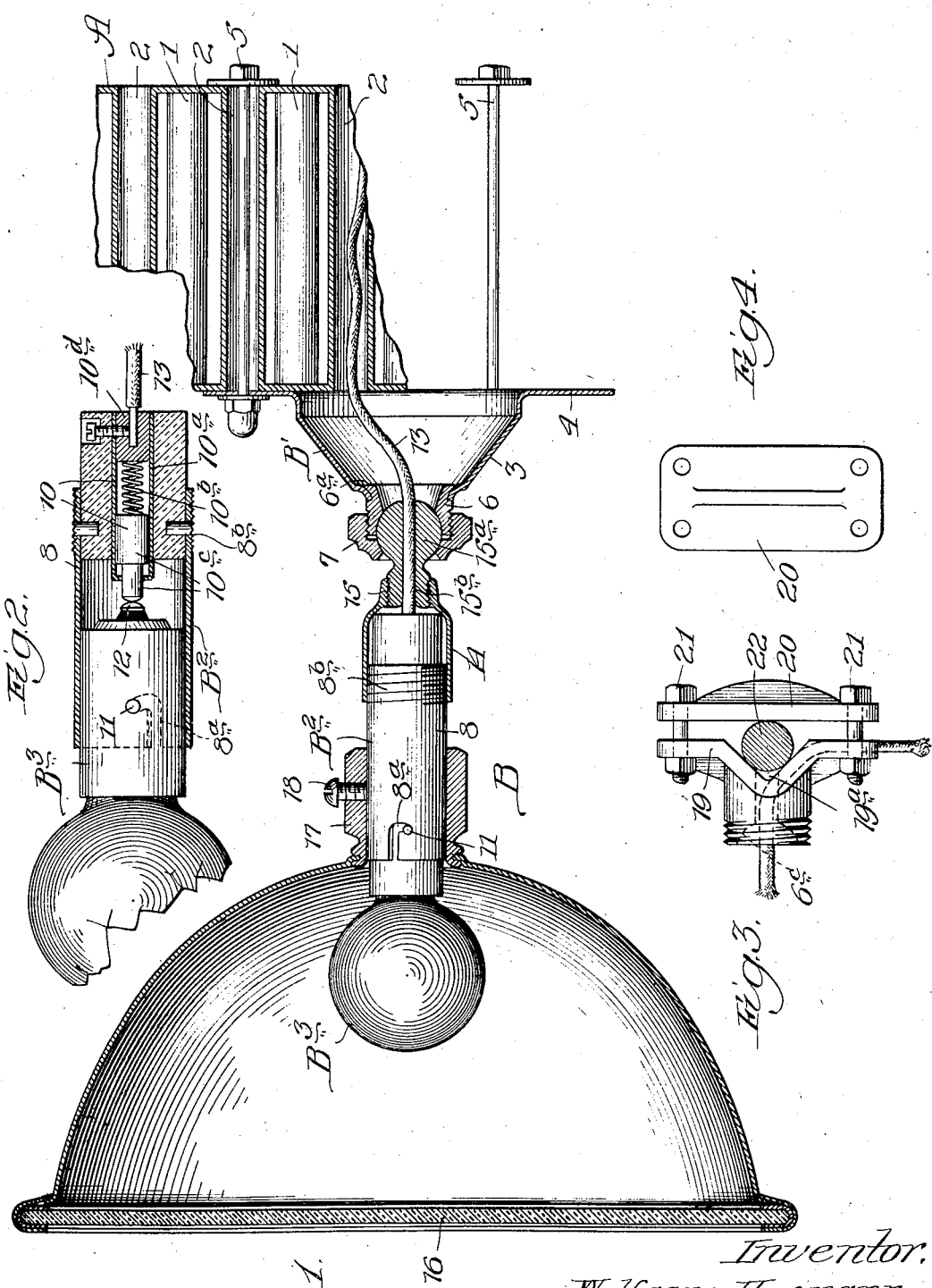

1,634,832

UNITED STATES PATENT OFFICE.

WOLFGANG HERMANN, OF CHICAGO, ILLINOIS, ASSIGNOR TO METAL SPECIALTIES MANUFACTURING COMPANY, OF CHICAGO, ILLINOIS, A CORPORATION OF ILLINOIS.

ELECTRIC LAMP.

Application filed October 11, 1924. Serial No. 743,062.

This invention relates particularly to an electric lamp which will serve effectively as a driving light for an automobile in situations where the use of the head-lights cannot be safely employed.

The primary object is to provide an improved device of this character which can be readily mounted on the radiator of an automobile, or at some other point in front of the radiator. The improved device will serve effectually to light up the roadway for a long distance in front of the automobile without causing inconvenience to drivers approaching from the opposite direction.

The invention is illustrated in its preferred embodiment in the accompanying drawing, in which—

Fig. 1 represents a broken sectional view showing the improved lamp applied to an automobile radiator; Fig. 2, a sectional view of the connector employed, showing a lamp bulb mounted therein; Fig. 3, a side elevational view showing a modified form of supporting bracket; and Fig. 4, a rear view of the same.

Referring to Figs. 1 and 2, A represents an automobile radiator; and B, an improved electric lamp mounted therein.

The radiator A may be of any suitable construction. As is well-known, automobile radiators are either of the tubular type, or are formed from sheet metal. In any case, the radiator may be described as of cellular construction, having alternating water chambers and air passages. In the illustration given, the water chambers are designated 1, and the air passages are designated 2.

The device B comprises a supporting bracket B'; an electric connector B², a lamp bulb B³, and a reflector B⁴.

The bracket B' preferably is stamped or drawn from sheet metal. It comprises a frusto-conical body portion 3 equipped with an attaching flange 4 which is secured to the radiator by means of bolts 5; a tubular socket member 6 secured to the contracted forward end of the body portion 3 of the bracket and provided with an exterior thread; and a nut 7 which, together with the member 6, provides a socket for a ball and socket joint. In the illustration given, the rear end of the member 6 extends through a central opening in the apex of the body portion 3 and is secured in position by a flange 6ª formed by a spinning operation.

The connector B², in the illustration given, comprises a metallic sleeve 8 in the rear end of which is secured an insulation plug 9 through which extends the spring contact 10. This contact is shown as comprising a sleeve 10ª, a spring 10ᵇ, and a plunger 10ᶜ. The forward end of the sleeve 8 is provided with bayonet slots 8ª, and the shank of the lamp bulb is provided with studs 11 adapted to engage the bayonet slots. The central terminal 12 of the lamp bulb is adapted to engage the extremity of the plunger 10ᶜ. The outer terminal of the lamp is, in the illustration given, "grounded" through the sleeve 8 which has metallic connection with the radiator. The tubular member 10ª of the contact 10 has its rear end fitted with a metallic plug 10ᵈ which is provided with a bore to which is secured the conductor 13, which is also extended, if desired, through an air passage of the radiator, and which may be connected with a suitable switch (not shown) mounted on the dash or instrument board of the machine.

The sleeve, or shell, 8 of the electric connector is provided at its rear end with an external thread 8ᵇ, upon which is secured a tubular nipple 14 which has a contracted rear end in which is secured the shank, or stem, 15 which has formed integrally therewith a ball 15ª. The member is provided with a central passage 15ᵇ through which the cord 13 extends.

The reflector B⁴ is equipped at its front end with a lens or glass plate 16 which is removably secured in position by any suitable device. The reflector is equipped at its rear side with a tubular shank 17 which carries the reflector and which, in turn, is mounted on the electric connector B². The reflector may be adjusted longitudinally with respect to the connector, and is suitably secured in place by means of a set screw 18. By means of this adjustment, the lamp bulb may be focused properly within the reflector.

The modified form of bracket shown in Figs. 3 and 4 comprises a pair of clamping members 19 and 20 which are secured together by bolts 21. The clamping member 19 is shown provided with a transverse notch 19ª adapted to accommodate a rod 22 upon which the bracket is mounted. The rod 22 may be, for example, a rod connecting the usual head-lights of the machine. Bracket-member 19 is provided with a tubular socket member 6ᵇ which corresponds with the socket member 6 shown in Fig. 1. The member 6ᵇ is provided with a part-spherical concavity 6ᶜ, as illustrated by dotted lines. The member 6ᵇ is externally threaded to receive a nut corresponding with the nut 7 shown in Fig. 1. Any other suitable form of bracket may be employed, as, for example, a bracket adapted to be secured to the front fender of a machine.

The improved lamp is adapted to be supported either on the radiator or in some position in front of the radiator and between the front fenders. By means of the ball and socket connection, the lamp device may be adjusted to throw the light in such direction as to light up the roadway for a long distance in advance of the machine without causing any glare which might discommode the drivers of approaching machines. The improved device is simple and may be manufactured at a moderate cost. Suitable provision may be made for turning the light off and on from the dash, as will be obvious to those skilled in the art.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a device of the character set forth the combination of a supporting bracket equipped with attaching means, an externally threaded socket member mounted on said bracket, a nut mounted on said socket member, said nut and socket member being provided internally with part-spherical surfaces, a tubular stem extending through said nut and equipped with a ball mounted in said socket member and secured therein by said nut, an electric connector comprising a metallic shell, a tubular nipple mounted on said stem and having threaded connection with said metallic shell, and a reflector having a tubular shank fitting on and secured to said metallic shell.

2. The combination with a radiator provided with air passages, of a bracket member having a base portion bearing against the front surface of the radiator, bolts extending through the air passages of the radiator and securing said bracket to the radiator, a nipple equipped with a tubular stem and ball, a socket member carried by said bracket and provided with a part-spherical inner surface, a nut threaded on said socket member and provided with a part-spherical surface, said ball being clamped between said socket member and nut and the tubular stem of said nipple extending through said nut, an electric connector comprising a metallic shell having screw connection with said nipple, a lamp bulb mounted in said connector, and a reflector mounted on and secured to said metallic shell.

WOLFGANG HERMANN.